(12) United States Patent
Sirigiri et al.

(10) Patent No.: US 10,560,480 B1
(45) Date of Patent: Feb. 11, 2020

(54) RULE ENFORCEMENT BASED ON NETWORK ADDRESS REQUESTS

(71) Applicant: Juniper Networks, Inc., Sunnyvale, CA (US)

(72) Inventors: Anil Kumar Reddy Sirigiri, Bangalore (IN); Suresh Vishwanathan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 336 days.

(21) Appl. No.: 15/205,717

(22) Filed: Jul. 8, 2016

(51) Int. Cl.
   *H04L 29/06* (2006.01)

(52) U.S. Cl.
   CPC .............. *H04L 63/20* (2013.01); *H04L 63/10* (2013.01)

(58) Field of Classification Search
   CPC .................................. H04L 63/10; H04L 63/20
   See application file for complete search history.

(56) References Cited

U.S. PATENT DOCUMENTS

| | | | | |
|---|---|---|---|---|
| 7,949,785 B2* | 5/2011 | Alkhatib | ................ | G06Q 30/02 709/245 |
| 8,447,856 B2* | 5/2013 | Drako | ................ | H04L 29/12066 709/203 |
| 8,621,556 B1* | 12/2013 | Bharali | ................ | H04L 61/1511 726/1 |
| 8,973,088 B1* | 3/2015 | Leung | ................ | H04L 63/00 726/1 |
| 9,419,942 B1* | 8/2016 | Buruganahalli | .... | H04L 63/0227 |
| 9,426,049 B1* | 8/2016 | Kalavade | ............ | H04L 43/0876 |
| 9,495,188 B1* | 11/2016 | Ettema | ................ | G06F 9/45533 |
| 9,736,185 B1* | 8/2017 | Belamaric | ............... | H04L 63/20 |
| 9,762,610 B1* | 9/2017 | Kwan | ................. | H04L 63/1458 |
| 9,825,909 B2* | 11/2017 | Ardeli | ................. | H04L 63/0227 |
| 9,860,208 B1* | 1/2018 | Ettema | ................. | G06F 21/602 |
| 2007/0180090 A1* | 8/2007 | Fleischman | ....... | H04L 29/12066 709/223 |
| 2008/0114862 A1* | 5/2008 | Moghaddam | ..... | G06F 17/30899 709/220 |

(Continued)

OTHER PUBLICATIONS

Rosenberg et al., "Session Initiation Protocol (SIP): Locating SIP Servers," http://www.rfc-base.org/txt/rfc-3263.txt, 15 pages, Jun. 2002.

*Primary Examiner* — Sharon S Lynch
(74) *Attorney, Agent, or Firm* — Harrity & Harrity, LLP

(57) ABSTRACT

A first device may include one or more processors. The first device may receive a network address request to obtain a network address that is associated with an application. The network address request may include application information that identifies the application. The first device may determine that the application is associated with a rule. The first device may store the application information and information identifying the network address request. The first device may obtain the network address based on the network address request. The first device may determine that the network address is associated with the rule. The first device may provide the network address, the rule, and/or the application information to a second device, to permit the second device to enforce the rule, based on determining that the application is associated with the rule and determining that the network address is associated with the rule.

20 Claims, 8 Drawing Sheets

(56) References Cited

U.S. PATENT DOCUMENTS

| | | | |
|---|---|---|---|
| 2008/0184357 A1* | 7/2008 | Drako | H04L 63/0236 726/11 |
| 2010/0054222 A1* | 3/2010 | Rune | H04L 29/12066 370/338 |
| 2010/0131646 A1* | 5/2010 | Drako | H04L 29/12066 709/225 |
| 2014/0150051 A1* | 5/2014 | Bharali | H04L 61/1511 726/1 |
| 2015/0012964 A1* | 1/2015 | Xie | H04L 63/0815 726/1 |
| 2015/0163245 A1* | 6/2015 | Kondamuru | H04L 29/12066 726/6 |
| 2015/0188949 A1* | 7/2015 | Mahaffey | H04L 63/20 726/1 |
| 2015/0200969 A1* | 7/2015 | Leung | H04L 63/00 726/1 |
| 2015/0256508 A1* | 9/2015 | Townsend | H04L 61/20 709/245 |
| 2015/0333930 A1* | 11/2015 | Aysola | H04L 63/0471 370/392 |
| 2015/0341285 A1* | 11/2015 | Aysola | H04L 63/0428 370/392 |
| 2016/0014082 A1* | 1/2016 | Bharali | H04L 61/1511 726/1 |
| 2016/0028847 A1* | 1/2016 | Bradshaw | H04L 67/2842 709/213 |
| 2016/0197963 A1* | 7/2016 | Xie | H04L 63/0815 726/1 |
| 2016/0226825 A1* | 8/2016 | Ardeli | H04L 63/0227 |
| 2016/0294877 A1* | 10/2016 | Xie | H04L 63/0236 |
| 2016/0359807 A1* | 12/2016 | Buruganahalli | H04L 63/0227 |
| 2017/0019425 A1* | 1/2017 | Ettema | G06F 9/45533 |
| 2017/0048197 A1* | 2/2017 | Zuk | H04L 63/0227 |
| 2017/0063928 A1* | 3/2017 | Jain | H04L 61/256 |
| 2017/0208034 A1* | 7/2017 | Rostami-Hesarsorkh | H04L 29/06557 |
| 2018/0013583 A1* | 1/2018 | Rubenstein | H04L 12/4633 |
| 2018/0013793 A1* | 1/2018 | Belamaric | H04L 63/20 |
| 2018/0084006 A1* | 3/2018 | Kwan | H04L 63/1458 |
| 2018/0139179 A1* | 5/2018 | Ettema | G06F 21/602 |
| 2018/0352004 A1* | 12/2018 | Leung | H04L 63/00 |

\* cited by examiner

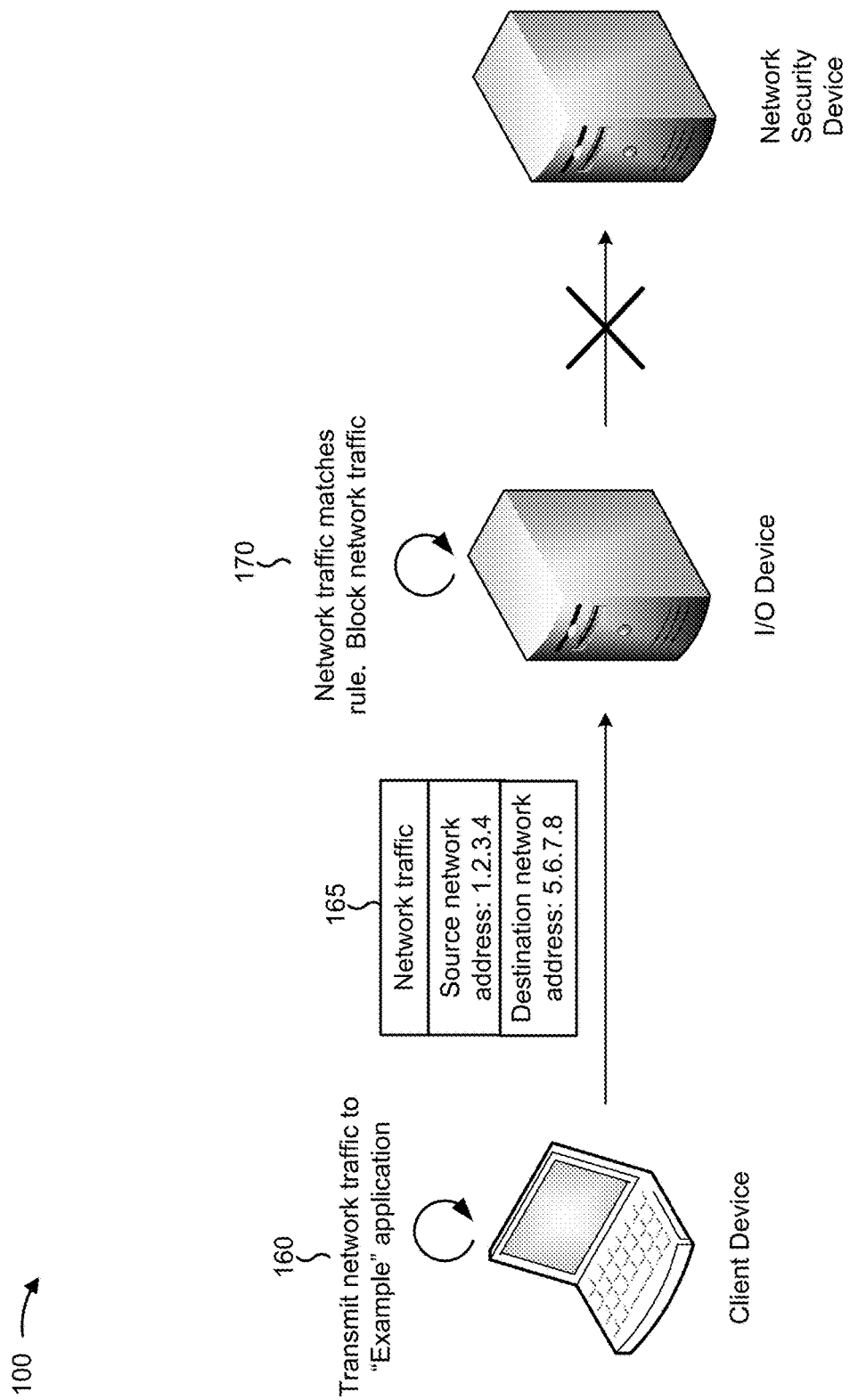

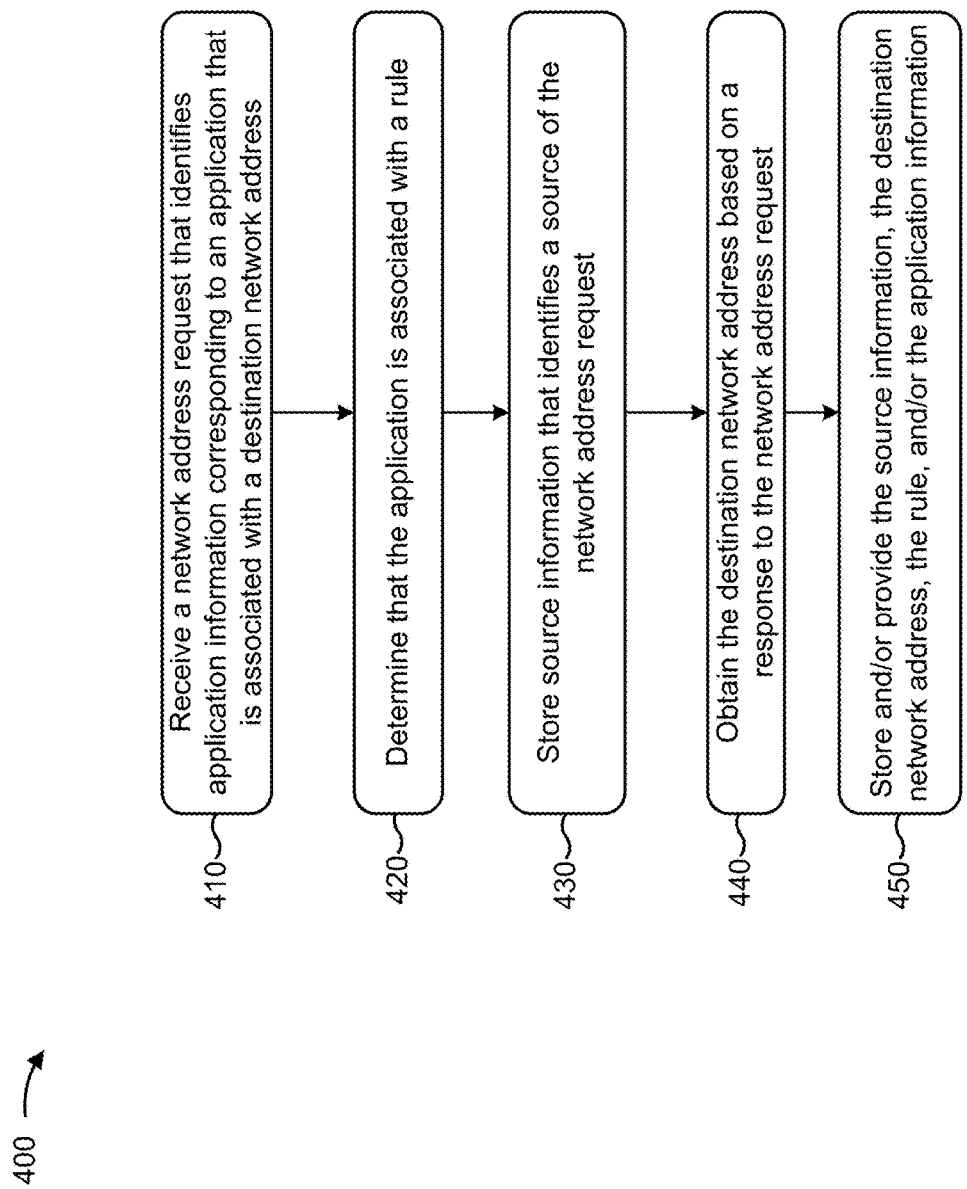

RULE ENFORCEMENT BASED ON NETWORK ADDRESS REQUESTS

BACKGROUND

A network administrator may implement rules to be enforced with regard to network traffic. For example, a rule may define an action to be performed with regard to network traffic that meets one or more criteria. The action may include blocking the network traffic, redirecting the network traffic, logging the network traffic, incrementing a counter, passing the network traffic, or the like.

SUMMARY

A first device may include one or more processors. The one or more processors may receive a network address request to obtain a network address that is associated with an application. The network address request may include application information that identifies the application. The one or more processors may determine, based on the application information, that the application is associated with a rule. The one or more processors may store the application information and information identifying the network address request. The one or more processors may obtain the network address based on the network address request. The one or more processors may determine that the network address is associated with the rule based on the stored application information and/or the stored information identifying the network address request. The one or more processors may provide the network address, the rule, and/or the application information to a second device, to permit the second device to enforce the rule, based on determining that the application is associated with the rule and determining that the network address is associated with the rule.

A non-transitory computer-readable medium may store one or more instructions that, when executed by one or more processors of a first device, cause the one or more processors to receive a network address request to obtain a network address that is associated with an application. The network address request may include application information that identifies the application. The one or more instructions, when executed by the one or more processors, may cause the one or more processors to determine, based on the application information, that the application is associated with a rule. The one or more instructions, when executed by the one or more processors, may cause the one or more processors to store the application information or information identifying the network address request based on the application being associated with the rule. The one or more instructions, when executed by the one or more processors, may cause the one or more processors to obtain the network address based on the network address request. The one or more instructions, when executed by the one or more processors, may cause the one or more processors to determine that the network address is associated with the rule based on the stored application information or the stored information identifying the network address request. The one or more instructions, when executed by the one or more processors, may cause the one or more processors to store or provide the network address, the rule, and/or the application information to a second device, to permit the second device to enforce the rule based on the network address, based on determining that the application is associated with the rule and determining that the network address is associated with the rule.

A method may include receiving, by a first device, a network address request to obtain a network address that is associated with an application. The network address request may include application information that identifies the application. The method may include determining, by the first device and based on the application information, that the application is associated with a rule based on the application information. The method may include storing, by the first device, the application information and information identifying the network address request. The method may include obtaining, by the first device, the network address based on the network address request. The method may include determining, by the first device, that the network address is associated with the rule based on the stored application information and the stored information identifying the network address request. The method may include storing or providing, by the first device, the network address and the rule to a second device to permit the second device to enforce the rule with regard to network traffic en route to or from the network address.

BRIEF DESCRIPTION OF THE DRAWINGS

FIGS. 1A-1C are diagrams of an overview of an example implementation described herein;

FIG. 4 is a flow chart of an example process for configuring an input/output device to monitor network traffic associated with an application.

DETAILED DESCRIPTION

Figure 1A:
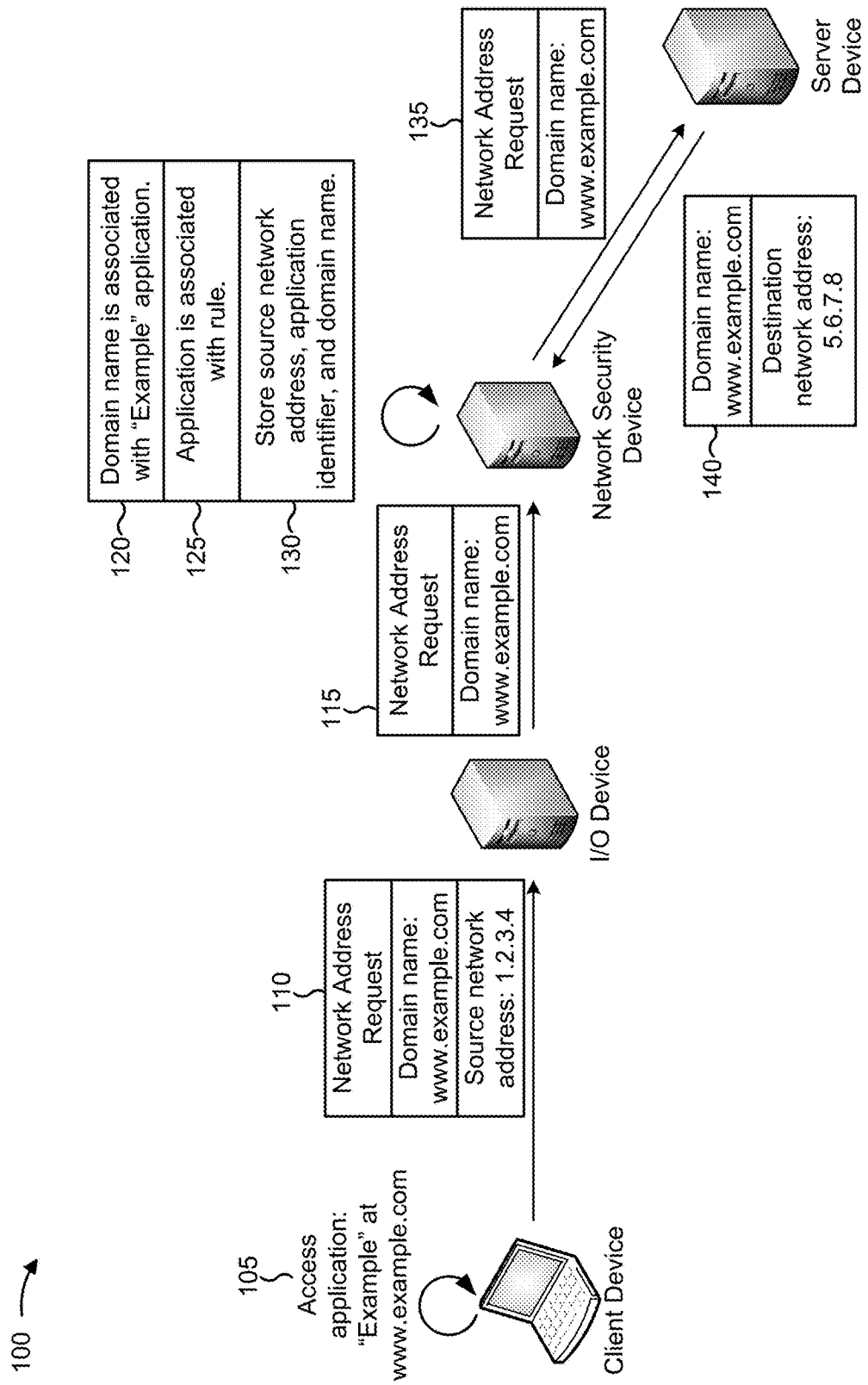

The following detailed description of example implementations refers to the accompanying drawings. The same reference numbers in different drawings may identify the same or similar elements.

A network security device may enforce rules with regard to network traffic. As one example, the network traffic may relate to an application, such as a videoconferencing service, a cloud service, or the like. To enforce the rules, the network security device may determine that the network traffic satisfies one or more criteria (e.g., based on information identifying the web application, based on a source and/or destination of the network traffic, based on content of the network traffic, etc.). For example, the network security device may perform a network traffic inspection procedure, such as deep packet inspection, to detect packets that satisfy the one or more criteria.

However, deep packet inspection may be difficult or impossible when the network traffic is routed via a secure session, such as a Hypertext Transfer Protocol Secure (HTTPS) session, a Transport Layer Security (TLS) session, or the like. For example, when filtering encrypted network traffic based on content of the network traffic, the content may be difficult or impossible to identify through an encrypted session. Furthermore, in some implementations, a network device (e.g., a gateway, a router, etc.) may include multiple, different network security devices (e.g., service processing units, line cards, etc.), which may reduce reliability of the inspection process and/or further increase processor usage (e.g., based on network traffic being routed via different network security devices, which each must be updated with current rules, inspection information, etc.).

Implementations described herein permit a network security device to detect network traffic that satisfies a rule based on a network address request (e.g., a DNS lookup, etc.) associated with the network traffic. The network security device may receive the network address request before a session is established to provide the network traffic, and may provide, to an input/output (I/O) device, information identifying the network traffic and/or the session. When the I/O device receives the network traffic and/or the session, the I/O device may determine that the network traffic and/or the session satisfies the rule, and may enforce the rule with regard to the network traffic and/or the session. In this way, the I/O device enforces rules based on source and destination network addresses of network traffic, rather than based on deep packet inspection, thereby permitting the rules to be enforced at an earlier stage and with regard to both encrypted and non-encrypted traffic.

In this way, network security is improved and processor usage of the network security device is reduced. Further, by providing the information identifying the network traffic to the I/O device, implementations described herein improve accuracy and conserve processor resources when network traffic may be provided to any one or more of multiple, different network security devices via the I/O device.

Figure 1B:
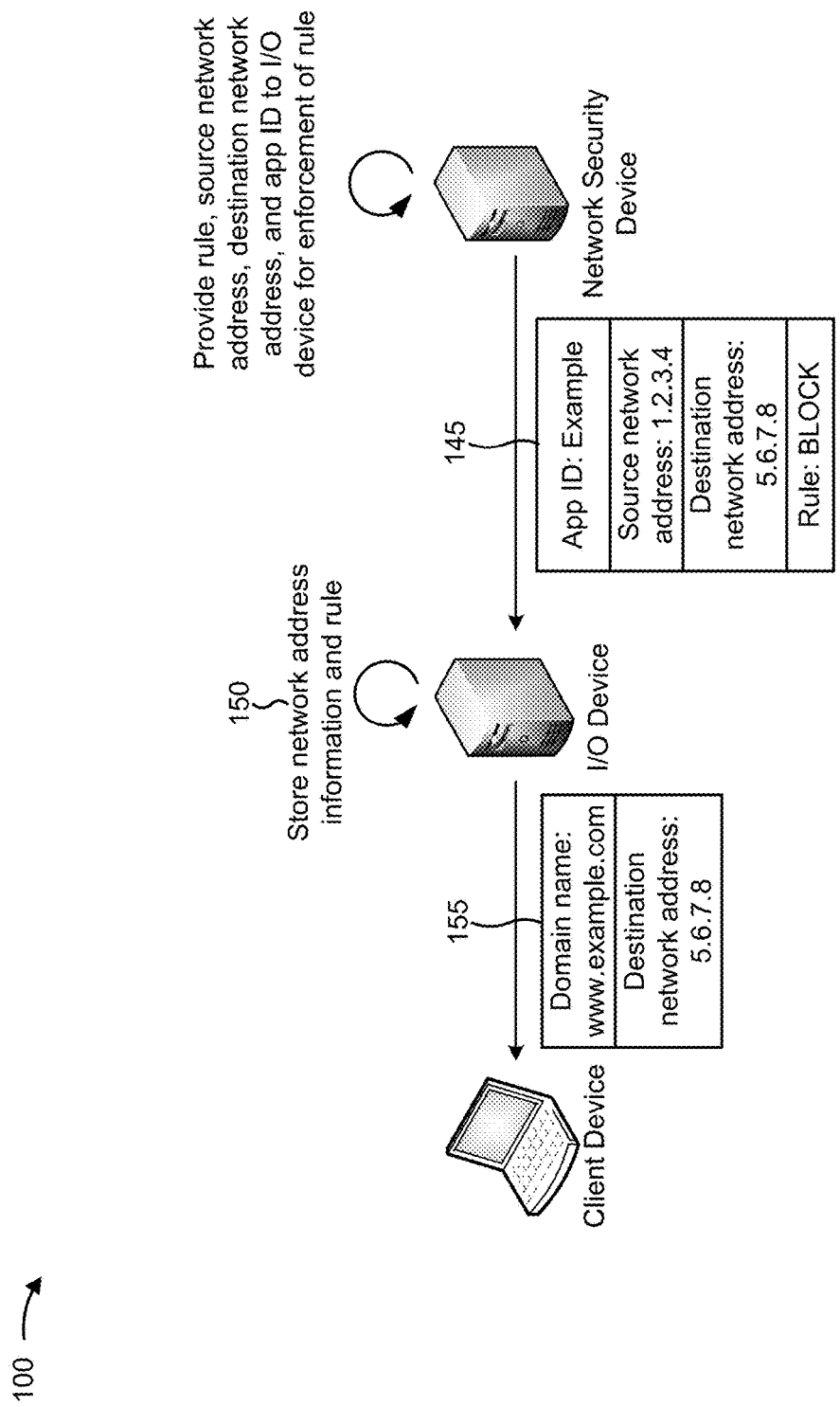

FIGS. 1A-1C are diagrams of an overview of an example implementation 100 described herein. As shown in FIG. 1A, and by reference number 105, a client device may determine to access an application. As further shown, the application is associated with an application name of Example and a domain name of www.example.com. The application name and the domain name may be referred to herein as application information corresponding to the application.

As shown by reference number 110, the client device may provide a network address request to an I/O device. The I/O device may provide network traffic from the client device to the network security device, and from the network security device to the client device. For example, the I/O device may include an I/O component of a line card, and the network security device may include a service processing unit.

As further shown, the network address request may identify the domain name of www.example.com, and may identify a source network address that is associated with the client device (e.g., 1.2.3.4). As shown by reference number 115, the I/O device may provide the network address request to the network security device.

As shown by reference number 120, the network security device may determine that the domain name of www.example.com is associated with the application (e.g., Example). For example, the network security device may store a data structure that identifies application information, corresponding applications, and rules corresponding to the application information and/or applications. The network security device may determine that the domain name is associated with the application based on information stored in the data structure.

As shown by reference number 125, the network security device may determine that the application is associated with a rule (e.g., based on information stored in the data structure). As shown by reference number 130, the network security device may store information identifying the source network address (e.g., 1.2.3.4), the application identifier (e.g., Example), and the domain name (e.g., www.example.com). In some implementations, the network security device may store information identifying the network address request to permit the network address to be matched with the network address request when the network address is received.

As shown by reference number 135, the network security device may provide the network address request to a server device. For example, the network address request may include a DNS lookup request, and the server device may include a DNS server. As shown by reference number 140, based on the network address request, the network security device may receive a destination network address corresponding to the domain name of www.example.com (e.g., 5.6.7.8).

As shown in FIG. 1B, and by reference number 145, the network security device may provide the rule (e.g., BLOCK, indicating to block network traffic associated with the source network address and the destination network address), the source network address (e.g., 1.2.3.4), the destination network address (e.g., 5.6.7.8), and the application identifier (e.g., Example) to the I/O device for enforcement of the rule. The rule may indicate to block the network traffic based on the application being a malicious application, based on a policy implemented by a network administrator to block the network traffic, based on the application using a particular amount of bandwidth, or the like. As shown by reference number 150, the I/O device may store the source network address and the destination network address. As shown by reference number 155, the I/O device may provide the destination network address to the client device based on the network address request.

As shown in FIG. 1C, and by reference number 160, the client device may transmit network traffic (e.g., a packet, an encrypted network traffic flow, a session, etc.) to a server that hosts the Example application. As shown by reference number 165, the network traffic may be associated with the source network address of 1.2.3.4 and the destination network address of 5.6.7.8. As shown by reference number 170, the I/O device may determine that the source network address of 1.2.3.4 and the destination network address of 5.6.7.8 match corresponding network addresses identified in the rule. As further shown, based on the source network address and the destination network address matching the rule, the I/O device may enforce the rule by blocking the network traffic.

By providing the source network address and the destination network address to the I/O device, processor resources of the network security device are conserved that would otherwise be used to perform inspection (e.g., DPI) of network traffic. Further, implementations described herein can be performed with regard to encrypted and/or secure network traffic, thus improving network security. For example, implementations described herein permit the network security device to identify network addresses to be monitored based on application information associated with a network address request, thereby enabling the I/O device to monitor network traffic associated with the network addresses without decrypting the network traffic.

As indicated above, FIGS. 1A-1C are provided merely as an example. Other examples are possible and may differ from what was described with regard to FIGS. 1A-1C.

Figure 2:
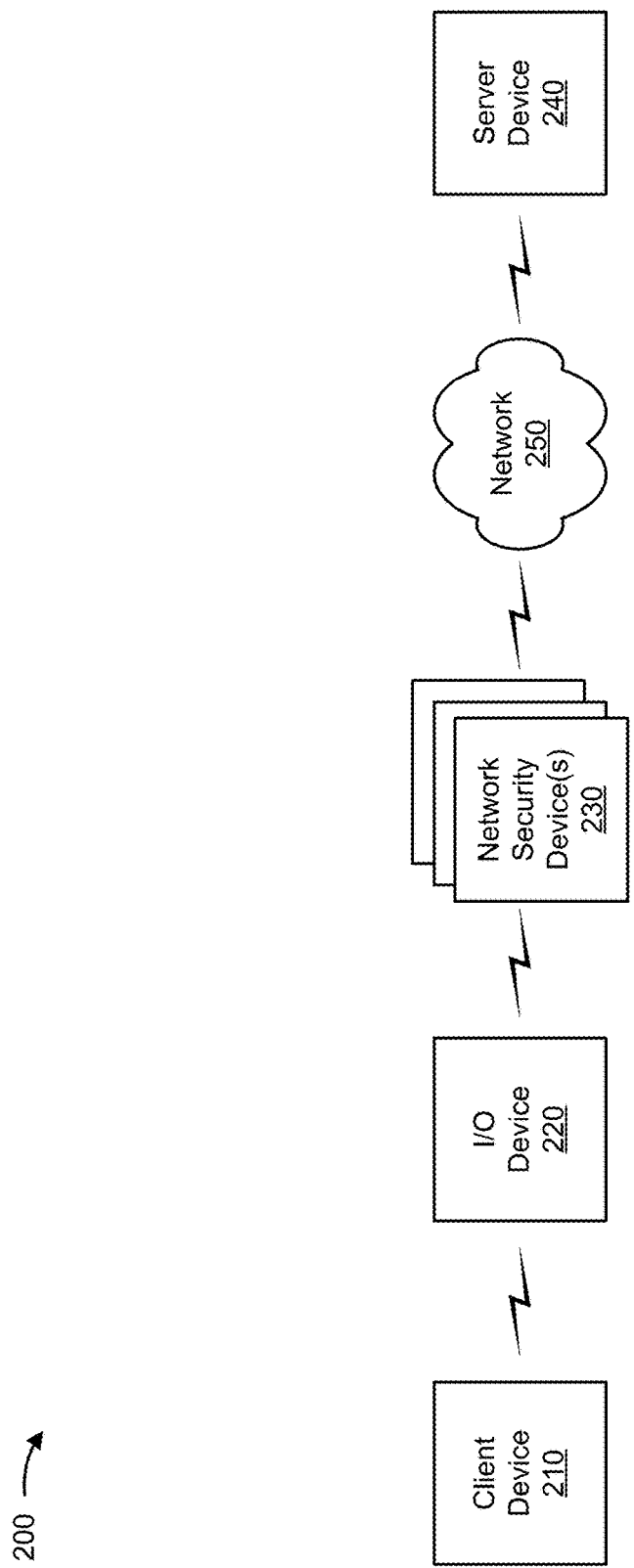
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, an input/output (I/O) device 220, one or more network security devices 230, a server device 240, and a network 250. Devices of environment 200 may interconnect via wired connections, wireless connections, or a combination of wired and wireless connections.

Client device 210 includes one or more devices capable of receiving, generating, storing, processing, and/or providing information, such as information associated with a network address request. For example, client device 210 may include a communication and/or computing device, such as a mobile phone (e.g., a smart phone, a radiotelephone, etc.), a desktop computer, a laptop computer, a tablet computer, a handheld computer, a gaming device, a wearable communication device (e.g., a smart wristwatch, a pair of smart eyeglasses, etc.), a server, a group of servers, or a similar type of device.

I/O device 220 includes one or more devices capable of receiving, generating, storing, processing, and/or providing network traffic and/or information defining rules to be enforced with regard to network traffic. For example, I/O device 220 may include a gateway, a router, a switch, a firewall, a network processing card, an input/output component of a line card, or a similar type of device. I/O device 220 may provide network traffic from client device 210 to network security device 230 and/or from network security device 230 to client device 210.

Network security device 230 includes one or more devices capable of receiving, generating, storing, processing, and/or providing network traffic. For example, network security device 230 may include a gateway, a router, a line card, a service processing unit, a switch, a firewall, or a similar type of device. In some implementations, network security device 230 may be capable of performing deep packet inspection or a similar network traffic inspection process. In some implementations, I/O device 220 and network security device 230 may be components of a particular device. For example, I/O device 220 may include an I/O component of a line card, and network security device 230 may include a service processing unit. As shown, in some implementations, I/O device 220 may be associated with multiple, different network security devices 230. For example, a particular line card may be associated with multiple, different service processing units.

Server device 240 includes one or more devices capable of receiving, generating, storing, processing, and/or providing network traffic (e.g., network traffic relating to an online application). For example, server device 240 may include a server, a group of servers (e.g., in a data center), a distributed computing environment (e.g., a cloud computing environment, etc.), or the like. In some implementations, server device 240 may include a Domain Name System (DNS) server.

Network 250 includes one or more wired and/or wireless networks. For example, network 250 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
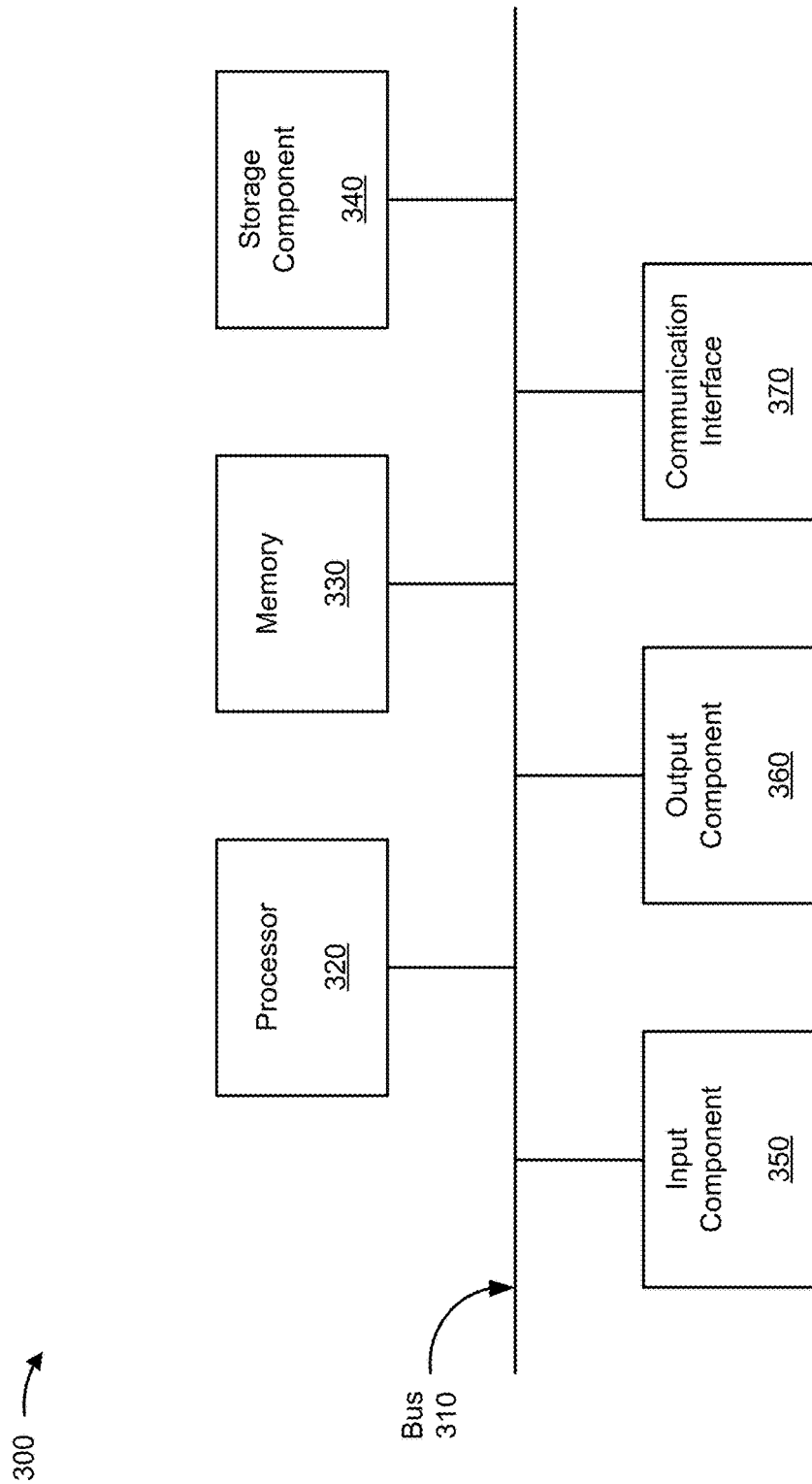
FIG. 3 is a diagram of example components of one or more devices of FIG. 2.

FIG. 3 is a diagram of example components of a device 300. Device 300 may correspond to client device 210, I/O device 220, network security device 230, and/or server device 240. In some implementations, client device 210, I/O device 220, network security device 230, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for configuring an input/output device to monitor network traffic associated with an application. In some implementations, one or more process blocks of FIG. 4 may be performed by network security device 230. In some implementations, one or more process blocks of FIG. 4 may be performed by another device or a group of devices separate from or including network security device 230, such as client device 210, I/O device 220, and/or server device 240.

As shown in FIG. 4, process 400 may include receiving a network address request that identifies application information corresponding to an application that is associated with a destination network address (block 410). For example, network security device 230 may receive a network address request from client device 210 (e.g., via I/O device 220). The network address request may include application information that identifies an application or service (e.g., a domain name, a hostname, a service name, an application identifier, etc.). Network security device 230 may receive the network address request, which may cause network security device 230 to obtain a destination network address corresponding to the application or service, or to a device that hosts the application or service.

In some implementations, the destination network address may include, for example, an Internet Protocol (IP) address or a similar type of network address. For example, when the application information includes a domain name or hostname, the destination network address may include an IP address corresponding to the domain name or hostname (e.g., based on a DNS database, etc.). The domain name or hostname may include or be part of, for example, a fully qualified domain name (FQDN), a uniform resource locator (URL), a uniform resource identifier (URI), or the like.

In some implementations, the destination network address may include a domain name, a hostname, or a similar type of network address. For example, in some cases, the application information may include a service name that is associated with a service or application (e.g., a SIP service, such as a streaming content service, a secure communication service, or the like). The service name may include, for example, a string of one or more characters that identifies a service (e.g., a name of a service, a transport protocol of the service, a domain name associated with the service, a port associated with the service, etc.). In such a case, the destination network address may include one or more domain names, hostnames, IP addresses, or the like, that are associated with one or more servers that provide the service and/or the application.

In some implementations, client device 210 may provide the network address request to obtain one or more destination network addresses associated with the application. For example, client device 210 may provide the network address request as part of a DNS resolution process. In such a case, the network address request may include a DNS service record query (e.g., a DNS SRV query) to obtain a hostname or domain name associated with a service name. Additionally, or alternatively, the network address request may include a DNS A query to obtain an IPv4 destination network address associated with a hostname or domain name. Additionally, or alternatively, the network address request may include a DNS AAAA query to obtain an IPv6 destination network address associated with a hostname or domain name.

In some implementations, network security device 230 may receive the network address request from client device 210 and/or I/O device 220. For example, client device 210 may provide the network address request to I/O device 220, and I/O device 220 may provide the network address request to network security device 230. In some implementations, network security device 230 may receive the network address request based on client device 210 determining to establish a session via which to send and/or receive network traffic. For example, client device 210 may determine to establish a secure session via network security device 230, and may provide the network address request to obtain a destination network address corresponding to a particular device or application with which the secure session is to be established.

As further shown in FIG. 4, process 400 may include determining that the application is associated with a rule (block 420). For example, network security device 230 may determine that the application and/or the application information is associated with a rule. In some implementations, network security device 230 may determine that the application is associated with the rule based on comparing the application information to a data structure that identifies application information and corresponding rules.

For example, assume that network security device 230 stores information indicating that application information that includes a string of "example" is associated with a particular rule. Assume further that network security device 230 detects the string of "example" in a network address request (e.g., based on parsing the network address request). In such a case, network security device 230 may identify an application associated with the application information (e.g., based on stored information identifying applications and corresponding application information) and may determine that the application and/or the network address request are associated with the particular rule. In some implementations, network security device 230 may determine that the network address request is associated with the particular rule based on the application information included in the network address request being associated with the particular rule. For example, network security device 230 may determine that the application information is associated with the particular rule without determining that the network address request is associated with the particular rule.

The rule may identify one or more actions to be performed with regard to network traffic that includes the application information or that is associated with the application. For example, the rule may indicate that the network traffic is to be passed, dropped, monitored, redirected, cached, decrypted, or the like. In some implementations, network security device 230 may receive information identifying rules from another device (e.g., client device 210, a network administrator device, etc.). In some implementations, network security device 230 may receive input (e.g., user input) that defines rules. In some implementations, network security device 230 may determine a rule automatically. For example, based on receiving malicious network traffic from a particular application, network security device 230 may generate a rule to cause network traffic that is associated with the particular application to be blocked. Thus, network security device 230 improves network security.

As further shown in FIG. 4, process 400 may include storing source information that identifies a source of the network address request (block 430). For example, based on determining that the application information corresponds to the application that is associated with the rule, network security device 230 may store source information identifying a source of the network address request (e.g., client device 210). The source information may include, for example, a network address of client device 210, a name associated with client device 210, a time stamp that identifies a time at which the network address request was generated or received, or the like. In some implementations, network security device 230 may store information that identifies the application information, an application identifier associated with the application (e.g., a string of one or more characters that identifies the application), or the like. Network security device 230 may provide the source information to I/O device 220 to permit I/O device 220 to enforce the rule, as described in more detail elsewhere herein.

As further shown in FIG. 4, process 400 may include obtaining the destination network address based on a response to the network address request (block 440). For example, network security device 230 may obtain the destination network address based on a response to the network address request. To obtain the destination network address, network security device 230 may provide the network address request to server device 240. For example, server device 240 may include a DNS server, and network security device 230 may provide the network address request to server device 240 as a DNS lookup query. In such a case, server device 240 may provide the destination network address as a response to the network address request.

In some implementations, network security device 230 may determine that the destination network address is associated with the network address request based on the application information and/or based on information identifying the network address request. For example, network security device 230 may store the application information and/or the information identifying the network address request (e.g., a time stamp associated with the network address request, a message identifier associated with the network address request, etc.) to permit network security device 230 to determine that the destination network address is associated with the network address request. When network security device 230 receives a destination network address (e.g., based on a network address request), network security device 230 may receive response information identifying a network address request associated with the destination network address, an application associated with the destination network address, a domain name or hostname associated with the destination network address, or the like. For example, the response information may include a time stamp, a message identifier, or the like, associated with the network address request.

Network security device 230 may identify the network address request, corresponding to the destination network address, based on comparing the response information to the application information and/or the information identifying the network address request. Based on identifying the network address request, network security device 230 may identify a source network address associated with client device 210 and/or a particular I/O device 220 from which the network address request was received. For example, network security device 230 may store source information that identifies the source network address (e.g., based on receiving the source network address from I/O device 220), and may determine the source network address based on determining that the source information is associated with the network address request and/or the destination network address. Network security device 230 may provide the source network address, the destination network address, and/or the rule to the particular I/O device 220 for enforcement of the rule, as described in more detail elsewhere herein.

As further shown in FIG. 4, process 400 may include storing and/or providing the source information, the destination network address, the rule, and/or the application information (block 450). For example, network security device 230 may store and/or provide, to I/O device 220, the source information, the destination network address, the rule, and/or the application information. By providing the source information and the destination network address, network security device 230 enables I/O device 220 to enforce the rule based on a source network address and a destination network address of network traffic. Thus, I/O device 220 conserves processor and network resources of network security device 230 that would otherwise be used to perform DPI or a similar process. Furthermore, I/O device 220 can enforce the rule without decrypting or modifying the network traffic, which enables I/O device 220 to enforce the rule with regard to encrypted or secure sessions.

In some implementations, I/O device 220 may enforce the rule based on the source information and the destination network address. For example, I/O device 220 may store the source information, the destination network address, and the rule. When I/O device 220 receives network traffic (e.g., a packet, a session establishment request, etc.) from client device 210, I/O device 220 may determine whether the source network address of client device 210 and the destination network address of the network traffic are associated with a rule. When the source network address and the destination network address are associated with a rule, I/O device 220 may perform the operation identified by the rule. Thus, I/O device 220 monitors network traffic based on the rule without performing DPI, thereby conserving processor resources of network security device 230.

In some implementations, network security device 230 may provide enforcement information relating to enforcement of the rule. For example, network security device 230 may provide enforcement information that identifies a particular time period for which to enforce the rule, and I/O device 220 may enforce the rule based on the enforcement information that identifies the particular time period (e.g., may stop enforcing the rule after the particular time period has ended or passed). As other examples, network security device 230 may provide enforcement information that identifies a quantity of sessions for which to enforce the rule (e.g., one session, ten sessions, etc.), enforcement information that identifies a quantity of network traffic for which to enforce the rule (e.g., a quantity of packets, a quantity of data, etc.), or the like.

In some implementations, I/O device 220 may store or provide information based on enforcing the rule. For example, I/O device 220 may provide application information identifying the application, may provide information identifying an action that was performed with regard to network traffic, may provide information identifying a time at which the action was performed, may provide particular network traffic on which the action was performed, or the like. In some implementations, I/O device 220 may provide the information for storage, may provide the information for client device 210 to display, or the like.

In some implementations, I/O device 220 may be associated with multiple, different network security devices 230. For example, assume that I/O device 220 is associated with a first network security device 230 and a second network security device 230. Assume further that I/O device 220 provides a network address request to the first network security device 230, and assume that the first network security device 230 obtains a destination network address based on the network address request. The first network security device 230 may provide the destination network address, a rule, and/or other information to I/O device 220 to permit I/O device 220 to monitor network traffic associated with the destination network address, irrespective of whether the network traffic is to be provided via the first network security device 230 or the second network security device 230. Thus, accuracy of the monitoring process is improved and processor resources of the first network security device 230 and the second network security device 230 are conserved.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
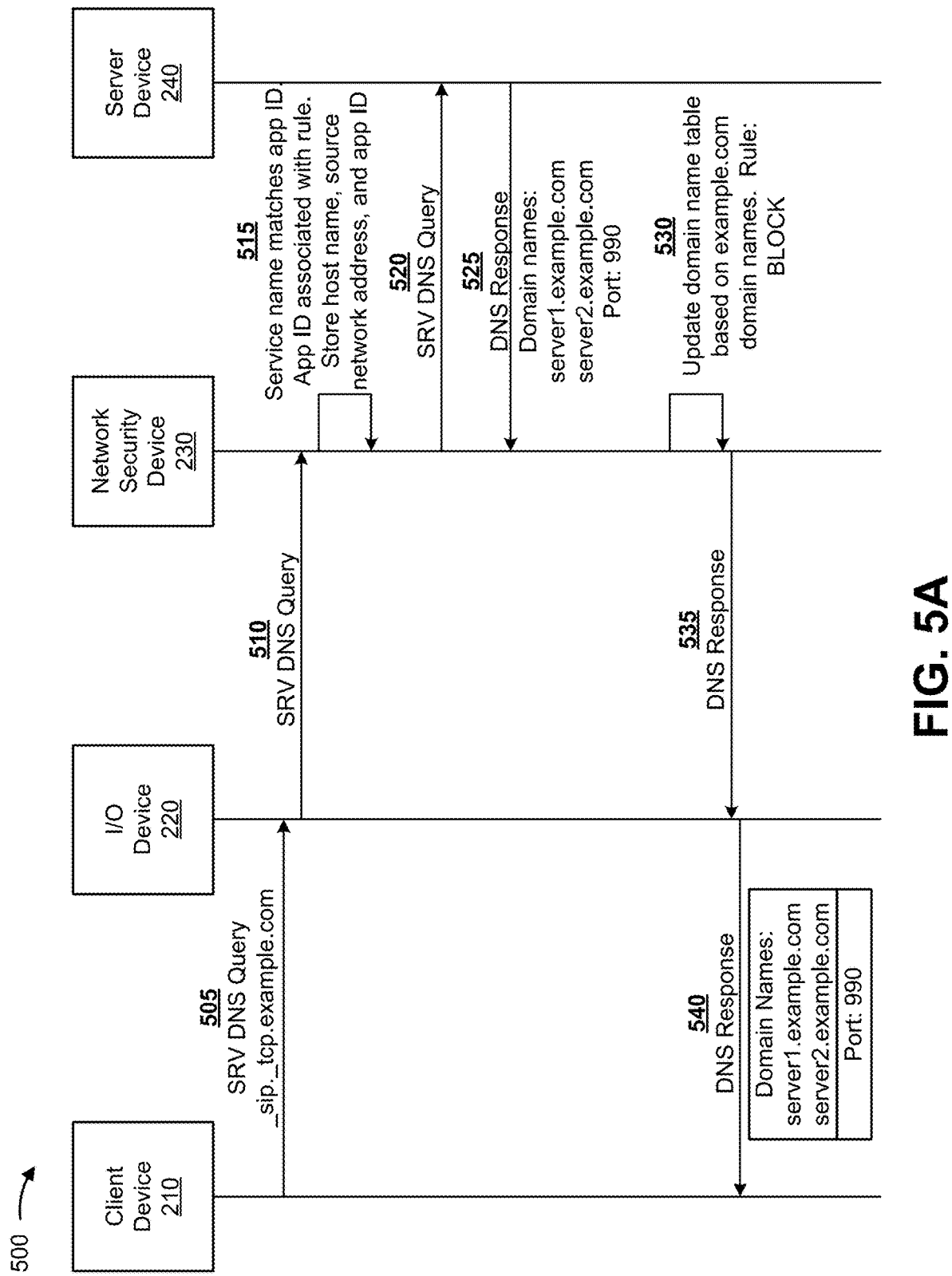
FIGS. 5A and 5B are diagrams of an example implementation relating to example process shown in FIG. 4.
Figure 5B:
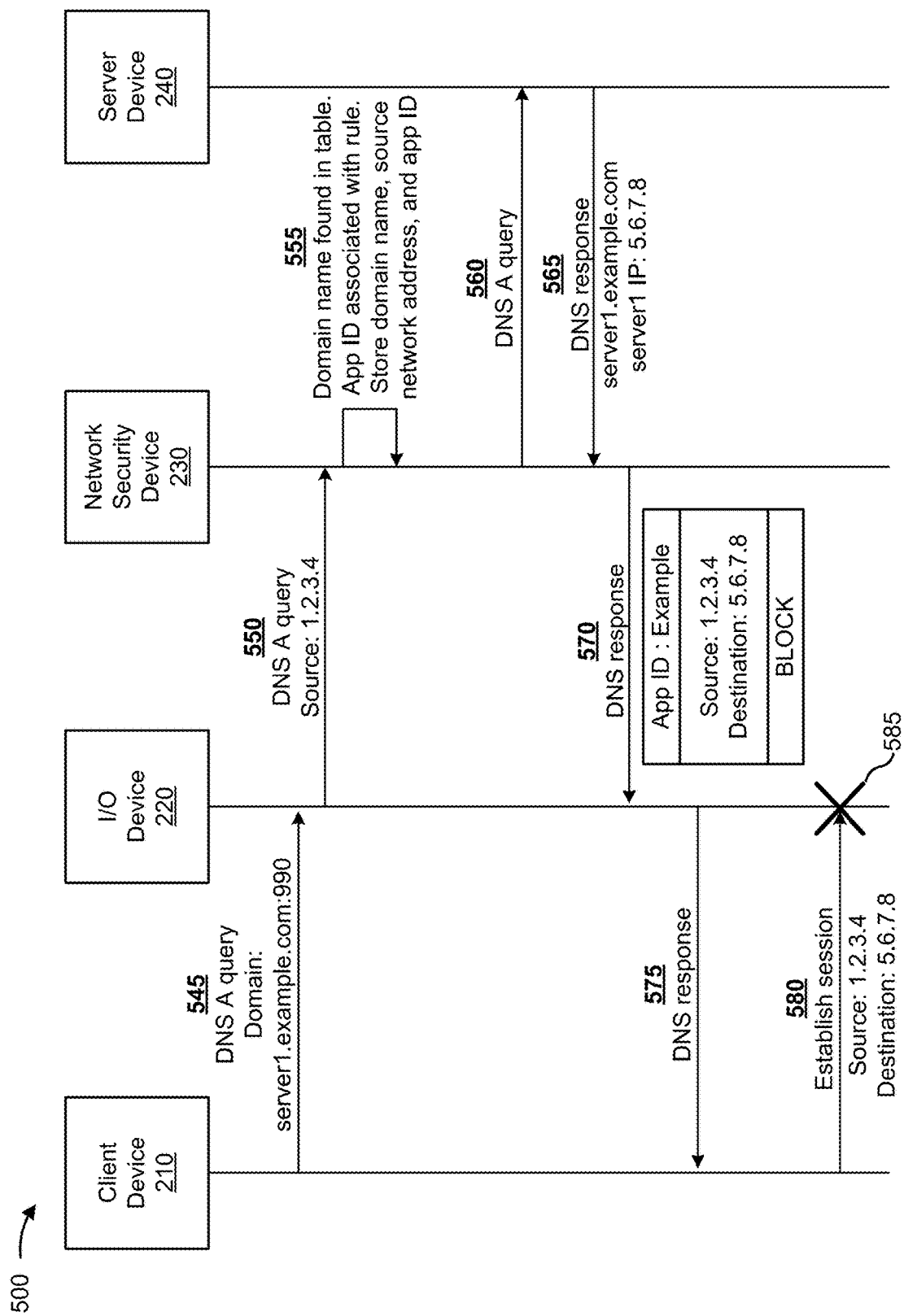

FIGS. 5A and 5B are call flow diagrams of an example call flow 500 for configuring an input/output device to monitor network traffic associated with an application.

As shown in FIG. 5A, and by reference number 505, client device 210 may provide a network address request (e.g., a service record request (SRV) DNS query) to I/O device 220. As further shown, the network address request may include a service name (e.g., _sip._tcp.example.com). For example, the service name may correspond to an application that is provided by a Session Initiation Protocol (SIP) server that is associated with a domain name of example.com. As shown by reference number 510, I/O device 220 may provide the SRV DNS query to network security device 230.

As shown by reference number 515, network security device 230 may determine that the service name matches an application identifier that is associated with a rule (e.g., based on a data structure identifying service names, application identifiers, and/or rules). Here, the rule indicates to block network traffic associated with the application identifier. As further shown, network security device 230 may store the service name, a source network address associated with client device 210, and the application identifier.

As shown by reference number 520, network security device 230 may provide the SRV DNS query to server device 240. As shown by reference number 525, network security device 230 may receive a DNS response from server device 240. As further shown, the DNS response may identify network addresses (e.g., domain names or hostnames) of servers that provide the application associated with the service name (e.g., server1.example.com and server2.example.com), and may identify a network port associated with the service (e.g., port 990).

As shown by reference number 530, network security device 230 may update a domain name data structure (e.g., a table) based on the domain names associated with the servers that provide the application, and based on the rule to block network traffic associated with the application. The domain name data structure may identify domain names that are associated with rules. Thus, when network security device 230 receives a DNS request that identifies a domain name of one of the servers that provide the application, network security device 230 may determine that the application is associated with the rule. In some implementations, the domain name data structure may be associated with or included in the data structure identifying service names, application identifiers, and/or rules.

As shown by reference number 535, network security device 230 may provide the DNS response to I/O device 220. As shown by reference number 540, I/O device 220 may provide the DNS response to client device 210. In some implementations, the DNS response from server device 240 may include network addresses as part of the response to the DNS SRV request, and I/O device 220 may enforce the rule based on the domain names, the port, and the source network address of client device 210.

FIG. 5B shows a continuation of the example call flow of FIG. 5A, for determining an IP address corresponding to the domain name determined in connection with FIG. 5A, above, and for monitoring network traffic based on the IP address. As shown in FIG. 5B, and by reference number 545, client device 210 may provide, to I/O device 220, a network address request (e.g., a DNS A query) to determine a network address corresponding to the domain name and port of server1.example.com:990. As shown by reference number 550, I/O device 220 may provide the network address request, and information that identifies a source network address of client device 210, to network security device 230.

As shown by reference number 555, network security device 230 may determine that the domain name is identified by the domain name data structure, and may store the domain name, the source network address, and an application identifier associated with the application. As shown by reference number 560, network security device 230 may provide the DNS A query to server device 240. As shown by reference number 565, based on the DNS A query, network security device 230 may receive a network address (e.g., an IP address) corresponding to the domain name of server1.example.com (e.g., 5.6.7.8).

As shown by reference number 570, network security device 230 may provide the application identifier (e.g., Example), the source network address (e.g., 1.2.3.4), the destination network address (e.g., 5.6.7.8), and information that identifies the rule (e.g., BLOCK) to I/O device 220. Assume that I/O device 220 stores the application identifier, the source network address, the destination network address, and the information that identifies the rule. As shown by reference number 575, I/O device 220 may provide the DNS response to client device 210.

As shown by reference number 580, client device 210 may attempt to establish a session (e.g., a SIP session, an HTTPS session, a TLS session, etc.) with a device corresponding to the destination network address of 5.6.7.8. As shown by reference number 585, based on the session being associated with the source network address and the destination network address, and based on the rule corresponding to the application, I/O device 220 may block the session from being established. Thus, I/O device 220 improves network security and reduces processor usage of network security device 230 by monitoring network traffic based on the source network address and the destination network address, rather than by providing the network traffic to network security device 230 for deep packet inspection. Further, I/O device 220 can perform the above operations irrespective of whether the session is a secure session (e.g., based on performing the above operations based on the source network address and the destination network address), thus improving network security in comparison to other network traffic monitoring processes, such as DPI or DNS inspection.

As indicated above, FIGS. 5A and 5B are provided merely as examples. Other examples are possible and may differ from what was described with regard to FIGS. 5A and 5B.

In this way, network security is improved and processor usage of a network security device is reduced. Further, by providing information identifying the network traffic to an I/O device, implementations described herein improve accuracy when network traffic may be routed to any one or more of multiple, different network security devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
   a memory; and
   one or more processors to:
   receive, from a client device, a domain name system (DNS) query to obtain a network address that is associated with an application and a destination,
   the DNS query being received before establishing a session to provide network traffic between the client device and the destination, and
   the DNS query including application information that identifies the application;
   determine, based on the application information, based on rule information stored in a data structure, and based on detecting, in the application information, a particular string that corresponds to a rule, that the application is associated with the rule;
   store the application information and information identifying the DNS query;
   obtain the network address based on providing the DNS query to a server device,
   the server device providing the network address based on the application information included in the DNS query;
   determine that the network address is associated with the rule based on the stored information identifying the DNS query; and
   provide, based on determining that the application and the network address are associated with the rule, the network address, the rule, and the application information to a second device, to cause the second device to enforce the rule without decrypting the network traffic between the client device and the destination.

2. The first device of claim 1, where the network address is a destination network address associated with the destination; and
   where
   the client device is associated with a source network address.

3. The first device of claim 2, where the one or more processors, when receiving the DNS query, are further to:
   receive the DNS query from the client device via the second device.

4. The first device of claim 1, where the one or more processors, when providing the network address, the rule, and the application information, are to:
   provide information identifying a time period,
   the rule to be enforced by the second device for the time period.

5. The first device of claim 1, where the DNS query is a first DNS query and the network address is a first network address; and
   where the first network address includes a hostname or a domain name corresponding to a service associated with the application; and
   where the one or more processors are further to:
   store, in the data structure, information indicating that the hostname or the domain name is associated with the rule or the application; and
   where the one or more processors are
   further to:
   receive a second DNS query,
   the second DNS query including the hostname or the domain name; determine that the second DNS query is associated with the rule based on the stored information indicating that the hostname or the domain name is associated with the rule;
   obtain, based on providing the second DNS query to the server device, a second network address; and provide the second network address and the rule to the second device based on determining that the second DNS query is associated with the rule.

6. A non-transitory computer-readable medium storing instructions, the instructions comprising:
one or more instructions that, when executed by one or more processors of a first device, cause the one or more processors to:
receive, from a client device, a domain name system (DNS) query to obtain a network address that is associated with an application and a destination,
the DNS query being received before establishing a session to provide network traffic between the client device and the destination, and
the DNS query including application information that identifies the application;
determine, based on the application information, based on rule information stored in a data structure, and based on detecting, in the application information, a particular string that corresponds to a rule, that the application is associated with the rule;
store the application information and information identifying the DNS query based on the application being associated with the rule;
obtain the network address based on providing the DNS query to a server device,
the server device providing the network address based on the application information included in the DNS query;
determine that the network address is associated with the rule based on the stored information identifying the DNS query; and
store or provide, based on determining that the application and the network address are associated with the rule, the network address, the rule, and the application information to a second device, to cause the second device to enforce the rule without decrypting the network traffic.

7. The non-transitory computer-readable medium of claim 6, where the rule indicates to provide the network traffic toward a second server device associated with the network address; and
where the one or more instructions, when executed by the one or more processors, further cause the one or more processors to:
receive the network traffic from the second device en route to the second server device; and
provide the network traffic toward the second server device.

8. The non-transitory computer-readable medium of claim 6, where the one or more instructions, when executed by the one or more processors, further cause the one or more processors to:
identify the DNS query based on performing deep packet inspection (DPI) with regard to network traffic received from the second device.

9. The non-transitory computer-readable medium of claim 8, where the DNS query is a first DNS query and the network address is a first network address; and
where the first network address includes a domain name or a hostname corresponding to the application; and
where the one or more instructions, that cause the one or more processors to store the network address, the rule, and the application information, cause the one or more processors to:
store, in the data structure, information indicating that the domain name or the hostname is associated with the rule;
where the one or more instructions, when executed by the one or more processors, cause the one or more processors to:
receive a second DNS query,
the second DNS query including the domain name or the hostname;
determine that the second DNS query is associated with the rule based on the stored information indicating that the domain name or the hostname is associated with the rule;
obtain, based on providing the second DNS query to the server device, a second network address; and
provide the second network address and the rule to the second device based on determining that the second DNS query is associated with the rule.

10. The non-transitory computer-readable medium of claim 6, where the network address is a destination network address; and
where
the client device is associated with a source network address.

11. The non-transitory computer-readable medium of claim 10, where the one or more instructions, that cause the one or more processors to receive the DNS query, cause the one or more processors to:
receive the DNS query from the client device via the second device; and
receive the source network address, with the DNS query, from the client device.

12. A method, comprising:
receiving, by a first device and from a client device, a domain name system (DNS) query to obtain a network address that is associated with an application and a destination,
the DNS query being received before establishing a session to provide network traffic between the client device and the destination, and
the DNS query including application information that identifies the application;
determining, by the first device, based on the application information, based on rule information stored in a data structure, and based on detecting, in the application information, a particular string that corresponds to a rule, that the application is associated with the rule;
storing, by the first device, the application information and information identifying the DNS query;
obtaining, by the first device, the network address based on providing the DNS query to a server device,
the server device providing the network address based on the application information included in the DNS query;
determining, by the first device, that the network address is associated with the rule based on the stored information identifying the DNS query; and
providing, by the first device and based on determining that the application and the network address are associated with the rule, the network address, the application information, and the rule to a second device to cause the second device to enforce the rule without decrypting the network traffic between the client device and the destination.

13. The method of claim 12, where providing the network address, the application information, and the rule further comprises:

providing enforcement information identifying one or more of:
a time period,
a quantity of sessions, or
a quantity of the network traffic,
the second device to enforce the rule based on the enforcement information.

14. The method of claim 12, where the network address is a first network address; and
where receiving the DNS query further comprises:
receiving the DNS query from the client device via the second device; and
receiving a second network address from the second device,
the second network address identifying the client device; and
where providing the first network address, the application information, and the rule comprises:
providing the first network address, the second network address, and the rule,
the second device to enforce the rule with regard to network traffic that is associated with the second network address and that is en route to a device associated with the first network address.

15. The method of claim 12, where the DNS query is a first DNS query and the network address is a first network address; and
where the first network address includes a hostname or a domain name corresponding to the application; and
where storing the first network address, the application information, and the rule further comprises:
storing information indicating that the hostname or the domain name is associated with the rule; and
where the method further comprises:
receiving a second DNS query,
the second DNS query including the hostname or domain name;
determining that the second DNS query is associated with the rule based on the information indicating that the hostname or domain name is associated with the rule;
obtaining, based on providing the second DNS query to the server device, a second network address; and
providing the second network address and the rule to the second device.

16. The first device of claim 1, where the rule defines one or more actions to be performed on the network traffic, the one or more actions including at least one of:
blocking the network traffic,
redirecting the network traffic,
logging the network traffic,
incrementing a counter associated with the network traffic, or
passing the network traffic.

17. The non-transitory computer-readable medium of claim 6, where the rule defines one or more actions to be performed on the network traffic, the one or more actions including at least one of:
blocking the network traffic,
redirecting the network traffic, logging the network traffic,
incrementing a counter associated with the network traffic, or passing the network traffic.

18. The non-transitory computer-readable medium of claim 6, where the one or more instructions, that cause the one or more processors to store or provide the network address, the rule, and the application information, further cause the one or more processors to:
store or provide enforcement information identifying one or more of:
a time period,
a quantity of sessions, or
a quantity of the network traffic,
the second device to enforce the rule based on the enforcement information.

19. The first device of claim 1, where the one or more processors, when providing the network address, the rule, and the application information, are to:
provide enforcement information identifying one or more of:
a time period,
a quantity of sessions, or
a quantity of the network traffic,
the second device to enforce the rule based on the enforcement information.

20. The method of claim 12, where the rule defines one or more actions to be performed on the network traffic, the one or more actions including at least one of:
blocking the network traffic,
redirecting the network traffic, logging the network traffic,
incrementing a counter associated with the network traffic, or
passing the network traffic.

* * * * *